United States Patent
Fink et al.

(10) Patent No.: US 7,428,542 B1
(45) Date of Patent: Sep. 23, 2008

(54) METHOD AND SYSTEM FOR COMBINING NODES INTO A MEGA-NODE

(75) Inventors: Steve Fink, San Carlos, CA (US); Malik Coates, San Francisco, CA (US); Russell H. Belfer, Burlingame, CA (US); Matthew T. Bell, Palo Alto, CA (US)

(73) Assignee: Reactrix Systems, Inc., Redwood City, CA (US)

( * ) Notice: Subject to any disclaimer, the term of this patent is extended or adjusted under 35 U.S.C. 154(b) by 325 days.

(21) Appl. No.: 11/142,115

(22) Filed: May 31, 2005

(51) Int. Cl.
*G06F 17/00* (2006.01)
*G06F 7/00* (2006.01)

(52) U.S. Cl. .......... 707/100; 707/10; 707/101; 707/102; 707/104.1; 707/200

(58) Field of Classification Search ......... 707/100–102, 707/104.1, 200–201; 345/156–157
See application file for complete search history.

(56) References Cited

U.S. PATENT DOCUMENTS

| | | | | |
|---|---|---|---|---|
| 6,654,734 | B1 * | 11/2003 | Mani et al. ............... | 707/2 |
| 6,826,727 | B1 * | 11/2004 | Mohr et al. .............. | 715/517 |
| 2002/0032697 | A1 * | 3/2002 | French et al. ............ | 707/500.1 |
| 2004/0015783 | A1 * | 1/2004 | Lennon et al. ............ | 715/523 |
| 2004/0073541 | A1 * | 4/2004 | Lindblad et al. .......... | 707/3 |
| 2005/0132266 | A1 * | 6/2005 | Ambrosino et al. ....... | 715/500.1 |
| 2006/0168515 | A1 * | 7/2006 | Dorsett et al. ............ | 715/513 |
| 2006/0242145 | A1 * | 10/2006 | Krishnamurthy et al. ... | 707/6 |

OTHER PUBLICATIONS

"An XML-based visual shading language for vertex and fragment shades"—Frank Goetz, Ralf Borau and Gitta Domik—3D technologies for the World Wide Web, Proceedings of ninth International Conference on 3D Web technology—ACM-2004 (pp. 87-97).*

"Contigra: an XML-based architecture for component-oriented 3D applications"—Raimund Dachselt, Michael Hinz and Kiaus Meibner—3D Technologies for the world wide web—Proceedings of the seventh international conference on 3D technology—ACM-2002 (pp. 155-163).*

"Optimized one-to-one personalization of web applications using a graph based model"—Sonneck, G. and Mueck, T.—IEEE-Apr. 22-26, 2003, on p. 9 pp.*

* cited by examiner

*Primary Examiner*—Jean Bolte Fleurantin
*Assistant Examiner*—Anh Ly
(74) *Attorney, Agent, or Firm*—Carr & Ferrell LLP (57) ABSTRACT

A method and system for combining nodes in a file used for loading a node graph. The method includes defining a first node in the file as a mega-node of the file. The XML file includes a plurality of nodes arranged in parent/child relationships. The method proceeds by identifying a base node type for basing the mega-node upon.

30 Claims, 4 Drawing Sheets

METHOD AND SYSTEM FOR COMBINING NODES INTO A MEGA-NODE

TECHNICAL FIELD

Embodiments of the present invention relate to the field of computer-generated graphics. More particularly, embodiments of the present invention relate generally to the combination of a subtree of nodes in a file used for loading a node graph into a mega-node for use in an effects engine.

BACKGROUND ART

Recent technological advancements have led to the creation of a new interactive medium, the interactive video display system. Interactive video display systems allow real-time unencumbered human interactions with video displays. Natural physical motions by human users are captured by a computer vision system and used to drive visual effects. The computer vision system usually uses images captured by a video camera as input and has software processes that gather real-time information about people and other objects in the scene viewed by the camera. An output image is generated based on the human interaction as applied to an effects engine.

In order to customize the interaction with a user, artists can design different pieces of content, also referred to herein as "spots" or "video spots," using the effects engine. A typical prior art effects engine is a large software component that is not easily changeable by the artist. That is, once the software component of the effects engine was implemented, artists who design spots using the effects engine had difficulty in tailoring the software component to achieve varying and customized effects. In particular, the software component was too large and complicated for the artist to understand how to manipulate and change the software component.

DISCLOSURE OF THE INVENTION

Embodiments of the present invention provide a method and system for combining nodes. In one embodiment, the method includes assigning a first node in a file used for loading a node graph as a mega-node of the file. The node graph includes a plurality of nodes arranged in hierarchical order (e.g., parent/child) relationships. In addition, the method proceeds by identifying a base node type for basing the mega-node upon. That is, the mega-node inherits all of the properties of the base node type.

Optionally, the method proceeds by assigning at least one other node in the plurality of nodes as children nodes of the base node type in the mega-node. Also, the method is capable of exposing a first previously defined attribute in the first node or the children nodes as a newly defined attribute in said mega-node.

In another embodiment, a system is described that is capable of combining nodes. The system includes a loading module for loading the file. The file is used for loading a node graph. The node graph is comprised of a plurality of nodes arranged in hierarchical order (e.g., parent/child relationships). The loading module is capable of determining which file to load for performing particular effects. The system also includes a parser for accessing the file and creating in-memory objects for each node in the file. In particular, the parser creates a define object for a mega-node that combines a subtree of nodes in the file. The mega-node includes a base node type. Additionally, the system includes a restoring module for copying the base node type as a representation of the mega-node into a registry of nodes of the file. As such, the mega-node is labeled in the registry under a name defined in the definition of the mega-node (e.g., by setting the 'name' attribute of the '<define>' node.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Reference will now be made in detail to the preferred embodiments of the present invention, a method and system for combining a subtree of nodes in file used for loading a node graph into a mega-node for use in an effects engine, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented partly on software running on a computer system. In particular, the software running on the computer system is representative of an effects engine (e.g., projection interactive video display system 100 of FIG. 1A). The computer system can be a personal computer, notebook computer, server computer, mainframe, networked computer, handheld computer, personal digital assistant, workstation, and the like. This software program is operable for combining a subtree of nodes in a file into a mega-node for use in an effects engine, examples of which are illustrated in the accompanying drawings. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "assigning," "creating," "accessing," "restoring," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for combining a subtree of nodes in a file into a mega-node for use in an effects engine. Embodiments of the present invention and their benefits are further described below.

Figure 1A:
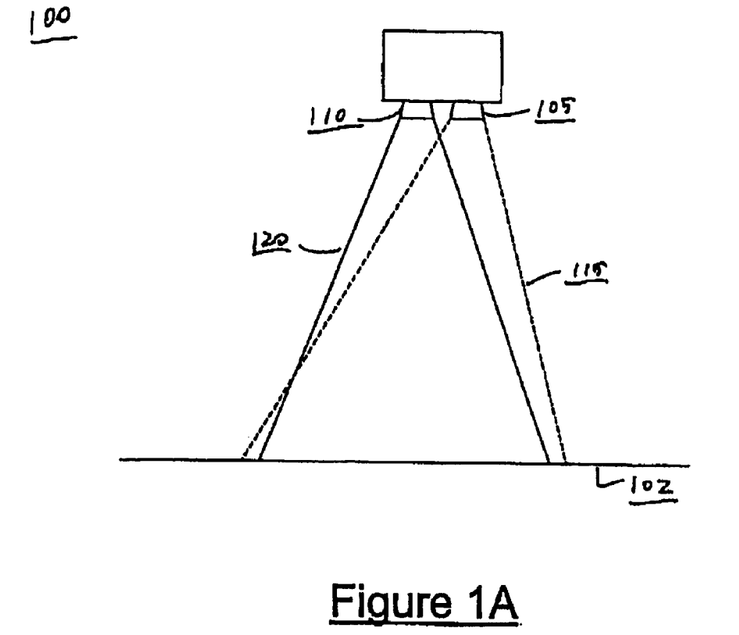
FIG. 1A illustrates a projected interactive video display system, in accordance with an embodiment of the present invention.

FIG. 1A illustrates a projected interactive video display system 100 in accordance with an embodiment of the present invention. Projected interactive video display system 100 uses a camera 105, a projector 110 that projects an image 120 onto the interactive space 115 of surface 102, and a local computer (not shown) that takes as input the image of camera 105 and outputs a video image to projector 110.

The local computer processes the camera 105 input to discern on a pixel-by-pixel basis what portions of the volume in front of surface 102 (e.g., interactive space 115) are occupied by people (or moving objects) and what portions of surface 102 are background. The local computer may accomplish this by developing several evolving models of what the background is believed to look like, and then comparing its concepts of the background to what camera 105 is currently imaging. Alternatively, components of the local computer that process camera 105 input are collectively known as the vision system. Various embodiments of projection interactive video display system 100 and the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. patent application Ser. No. 10/974,044, filed on Oct. 25, 2004, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Figure 1B:
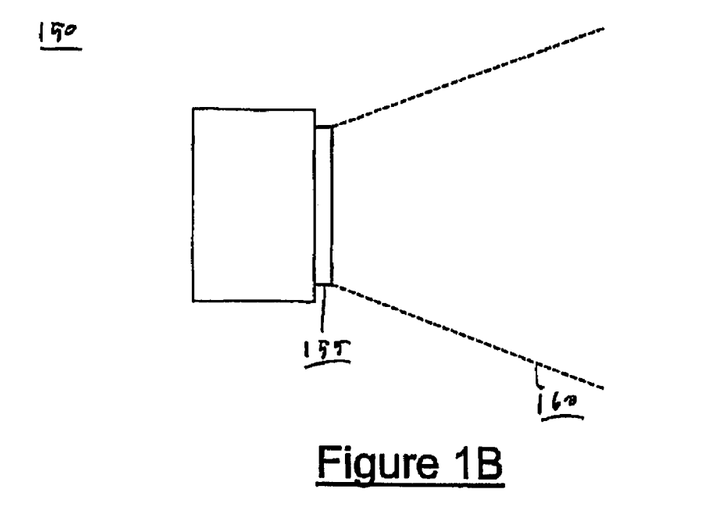
FIG. 1B illustrates a self-contained interactive video display system, in accordance with an embodiment of the present invention.

FIG. 1B illustrates a self-contained interactive video display system 150 in accordance with an embodiment of the present invention. Self-contained interactive video display system 150 displays an image onto display screen 155, and uses a camera (not shown) to detect people and objects in interactive space 160. A local computer, also referred to as the image system, takes as input the image of the camera and outputs a video image to display screen 155.

The camera input image is an image representing a real world scene viewed by the camera. This real world scene contains a static background of unknown brightness and appearance as well as various foreground objects that are able to move, such as, people and objects held or moved by people. The camera input image may be manipulated or cropped so that the area viewed by the camera corresponds to the boundaries of a display.

Various embodiments of self-contained interactive video display system 150 are described in co-pending U.S. patent application Ser. No. 10/946,263, filed on Sep. 20, 2004, entitled "SELF-CONTAINED INTERACTIVE VIDEO DISPLAY SYSTEM," by Bell et al., and assigned to the assignee of the present application, co-pending U.S. patent application Ser. No. 10/946,084, filed on Sep. 20, 2004, entitled "SELF-CONTAINED INTERACTIVE VIDEO DISPLAY SYSTEM," by Bell, and assigned to the assignee of the present application, and co-pending U.S. patent application Ser. No. 10/946,414, filed on Sep. 20, 2004, entitled "INTERACTIVE VIDEO WINDOW DISPLAY SYSTEM," by Bell, and assigned to the assignee of the present application, all of which are herein incorporated by reference. Furthermore, various embodiments of the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. patent application Ser. No. 10/974,044, filed on Oct. 25, 2004, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Various embodiments of the present invention are described herein. According to one embodiment of the present invention, a subtree of nodes in an XML file are combined into a mega-node for use in an effects engine (e.g., the interactive video display system 100 of FIG. 1A).

For purposes of illustration only, embodiments of the present invention are described within the context of combining nodes into a mega-node in an extensible markup language (XML) file. However, it is not intended to limit the use of a mega-node to XML files as embodiments of the present invention are well suited to combining nodes in any file that is used for loading a node graph. For instance, in one embodiment, nodes are combined into a mega-node in an XML file. In another embodiment, nodes are combined into a mega-node in a file defined by any markup language. In still another embodiment, nodes are combined into a mega-node in a file that is defined in a serialization format. Further, in another embodiment, nodes are combined into a mega-node in a file defined by any user-editable serialization format.

Content that is implemented within a mega-node is unique because it utilizes camera input information, in accordance with one embodiment of the present invention. in contrast to keyboard/mouse input, which is discrete, the camera input information can have a very large number of simultaneous actions. As a result, the image processing pipelines that are processing the camera input information involve the passage of large amounts of relevant data. Any node within a system, such as the projected interactive video display systems of FIGS. 1A and 1B, that handles image processing is likely to be processor-intensive. That node is ideally a precompiled component written in a low-level programming language, such as C++.

However, other embodiments of the present invention handle content using a scripting language. For instance, content, such as the result of object interactions and game state, are best handled in scripting, since they are tailored to a specific piece of content.

The present embodiment is able to define a mega-node that is able to combine multiple nodes as well as scripted behavior. As a result, the mega-node can support both scripted content, precompiled content, and combinations of scripted and precompiled content. As a result, because a mega-node is able to support both scripts, and precompiled image analysis nodes or precompiled image transformation nodes, use of the mega-node allows for rapid development of content for interactive video display systems.

Figure 2:
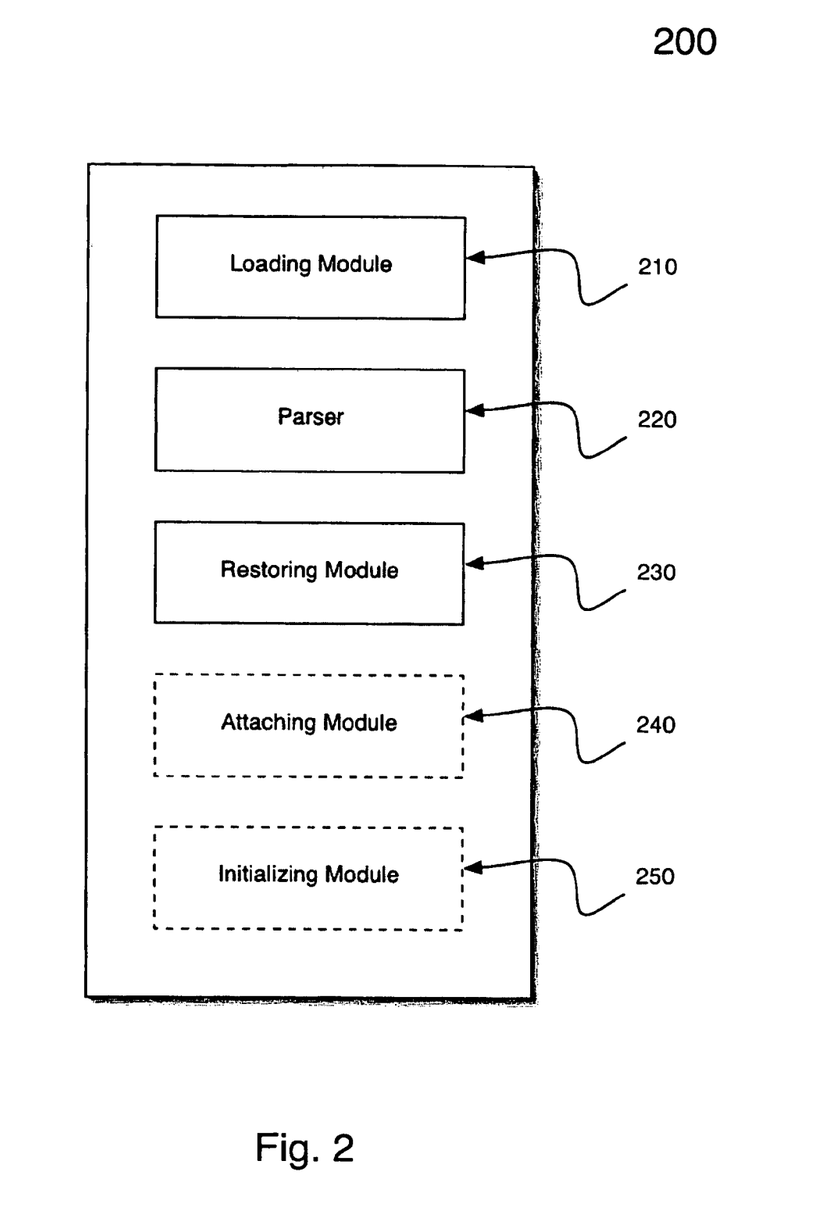
FIG. 2 is a block diagram illustrating a system that is capable of combining a subtree of nodes in a file into a mega-node for use in an effects engine, in accordance with one embodiment of the present invention.

FIG. 2 is a block diagram of a system 200 that is capable of combining a subtree of nodes in a file (e.g., an XML file) used for loading a node graph into a mega-node for use in generating effects, in accordance with one embodiment of the present invention. The present embodiment is described within the context of XML files as representative of any file of any format used to load a node graph. In addition, the system 200 is used to read the XML file and execute the functions defined in the XML file to generate visual effects, in one embodiment. For example, the system 200 is an effects engine (e.g., the projection interactive video display system 100) that is capable of generating effects from video input.

The system 200 includes a loading module 210. The loading module 210 loads the corresponding XML file that is used to generate particular effects. The XML file includes a plurality of nodes, as specified by tags, arranged in hierarchical order, for example parent/child relationships. As such, the hierarchical order provides a node graph representative of the nodes in the XML file.

In one embodiment, the system 200 is capable of supporting multiple XML files. Each of the XML files is capable of generating a particular set of visual effects from a video input. As such, the loading module 210 is capable of selecting the proper XML file for use in the system 200.

Each of the nodes of the XML file is a component of the system 200 that is capable of performing operations that are used to generate visual effects. In one embodiment, each of the nodes is defined within a C++ class. Within each node, selectable attributes are defined for use in the operations of the node. For example, the attributes define inputs and outputs of the node. As such, the nodes in the XML file are connected together by linking an output from one node to an input to another node in order to generate the visual effect as desired.

After the loading module 210 loads the appropriate XML file, a parser 220 accesses the XML file in order to read the XML file into the system 200. That is, the parser 220 reads the XML file and recognizes the tags in the XML file. In particular, the parser 220 creates in-memory objects (e.g., C++ object) for each node in the XML file. That is, the parser 220 creates an in-memory data structure representative of the node graph as specified in the XML file. For instance, the object for the node includes all of the attributes and methods executed by the node, as well as a list of children nodes.

In addition, the parser 220 is capable of generating an object for a mega-node that combines a subtree of nodes in the XML file. The parser 220 generates an object that generally defines the node as a mega-node. For example, the parser 220 can read the mega-node defining tag that is in the following form:

<define name='my-node" base="show-image" />

As such, the mega-node defining node is what is creating as a result of parsing the "<define>" node.

In addition, the mega-node is based upon a base node type. The base node type is a string (word or small group of words) chosen from all of the available strings that are predefined in the application's registry. As such, the mega-node inherits all the properties of the base node type.

In one embodiment, the mega-node definition need not have any children nodes. For instance, a mega-node will act as the type of node that the 'base' attribute refers to. In this case, the mega-node is still useful if there are not any children. For example, a mega-node without any children is used to set a default value, as described in pseudocode below:

<define name="show-button" base="show-image" defaults="filename=button.png" />

In another embodiment, the mega-node optionally includes at least one other node as children nodes of the base node type. The children nodes are taken from the plurality of nodes defined by the XML file.

Figure 3:
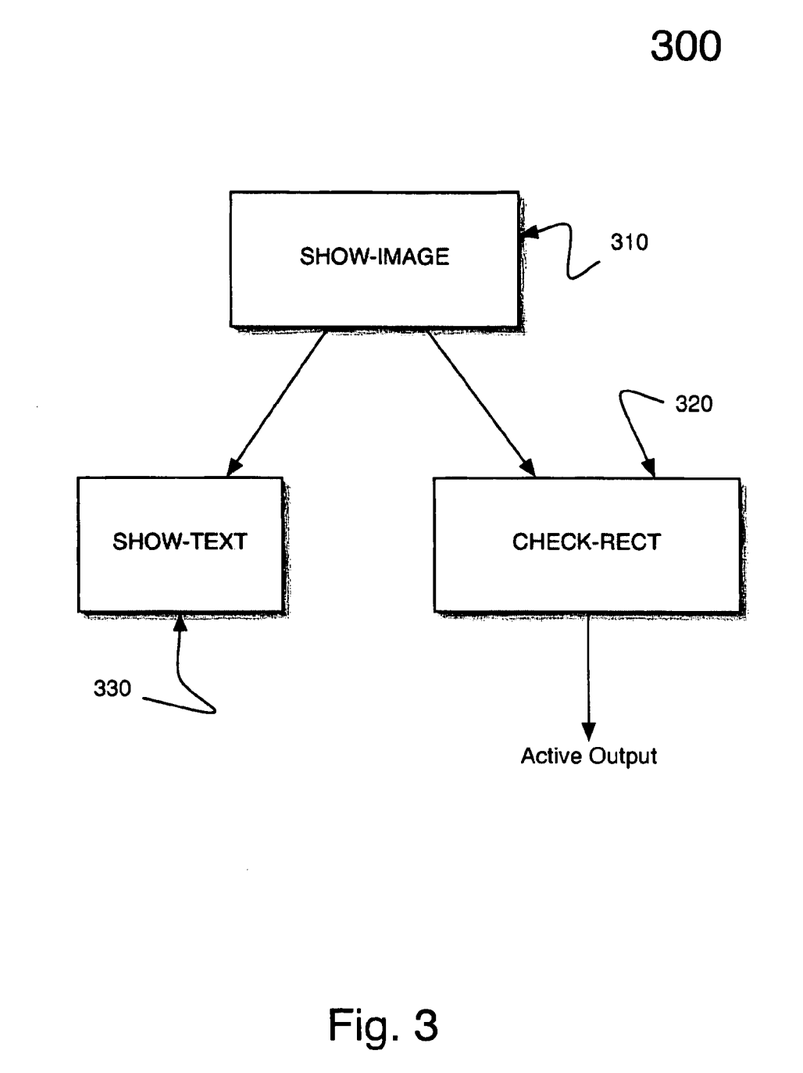
FIG. 3 is an illustration of an exemplary node tree 300 of an XML file, in accordance with one embodiment of the present invention.

For example, FIG. 3 is an illustration of an exemplary node tree 300 of a file used to load a node graph (e.g., an XML file), in accordance with one embodiment of the present invention. The node tree 300 illustrates the hierarchical order of the nodes in the node tree 300. As shown in FIG. 3, the node tree 300 includes three nodes: a show-image node 310, a check-rect node 320, and a show-text node 330. The show-image node 310 is a parent node. The check-rect node 320 and the show-text node 330 are children of the show-image node 310. In addition, an active output is generated by the check-rect node 320.

The show-image node 310 performs functions to generate a video image to be displayed as an effect, as an example. The check-rect node 320 defines a rectangular block on the display from which external inputs are received. For example, the inputs can be points within the rectangular block upon which the display was touched. The show-text node 330 provides for text to be displayed.

More particularly, the show-image node 310 and the check-rect node 320 can be combined into a mega-node. That is, the hierarchical order and the interrelationships between the show-image node 310 and the check-rect node 320 can be combined into one mega-node representation. As such, rather than duplicating the code for the show-image node 310 and the child check-rect 320 each time they are implemented together in the XML file, the mega-node representation can be used in substitution.

Table 1 is a corresponding representation of the mega-node in an XML file that encapsulates the relationship between the show-image node 310 and the check rect node 320 in the node tree 300 of FIG. 3, in accordance with one embodiment of the present invention.

TABLE 1

Mega-Node Representation of a Subtree

<define name = "touchable-image"
  base = "show-image">

TABLE 1-continued

Mega-Node Representation of a Subtree

```
        touched.bind = check-rect@active
        speed:int = 30
        pos=300,200
        <check-rect pos.link = . . . />
    </define>
```

As shown in Table 1, the mega-node representation of the subtree includes the show-image node 310 and the check-rect node 320. The "define" tag indicates that a mega-node is defined with the name of "touchable-image." As such, this new tag, "touchable-image," can be used later within the XML file.

In addition, the base node type of the mega-node is the show-image node 310. The check-rect node 320 is the child of the base node type, "show-image." As an illustration of the parent/child relationship exhibited between the show-image node 310 and the check-rect node 320, a new attribute, "touched," is defined in the mega-node. The "touched" attribute is bound to the active output 340 of the check-rect 320 node. That is, within the show-image node 310, an attribute is defined by looking to a preexisting attribute of the child node, check-rect 320, of the show-image node 310. As such, the mega-node can expose a previously defined attribute through a newly defined attribute. The previously defined attribute is used in the base node type or its children nodes.

In another embodiment, the mega-node is based on a neutral group file for the node graph 300 of FIG. 3. The group file does not perform any operations in the file. As such, both the show-image node 310 and the check-rect node 320 are children of the group file.

As such, returning now to FIG. 2, the parser 220 generates objects for the nodes in the XML file, including an object for each mega-node in the XML file.

In addition, the system 200 includes a restoring module 230 that is capable of integrating the mega-node as defined by the parser into a registry of nodes for the XML file. In that case, the mega-node can be implemented within the XML file and be recognized by other nodes within the XML file.

In particular, the restoring module 230 registers the mega-node as a valid tag within the registry of nodes for the XML file. As a result, new nodes are entered in the registry for the XML file, which was previously not possible in conventional systems implementing the XML file for generating effects.

For instance, the restoring module 230 labels the mega-node under a defined name (e.g., "touchable-image" from Table 1). That is, the restoring module 230 copies the base node type and the children nodes into the global registry under its newly defined name. As such, whenever the mega-node is called within the XML file, the base node type and any of its children nodes are inserted at that location in the XML file.

As an illustration, in the example of Table 1, whenever the mega-node "touchable-image" is called at a particular location within the XML file, the base node type, "show-image," as well as the child node, "check-rect," are copied out and inserted at that location.

In another embodiment, the restoring module 230 sets values for attributes in the nodes of the node tree of the XML file. That is, the restoring module accesses data that is used to set the attribute. The data can be accessed both from within the XML file itself, from other XML files, or as inputs to the XML file. In addition, the restoring module 230 sets default values for the attributes in the nodes of the XML file.

In addition, the system 200 includes an attaching module 240. The attaching module 240 sets up the linkage paths between the nodes. More particularly, the attributes are linked or hooked up between the nodes of the XML file. For example, nodes are linked together through their inputs and outputs. For instance, the output of one node is the input to another node in the node graph of the XML file.

Also, the system 200 includes the initializing module 250. The initializing module 250 initializes the nodes before runtime of the XML file. That is, after the nodes are arranged in their proper order by the attaching module 240, the initializing module 240 initializes the system for generating the output of the system 200.

In addition, the system 200 also includes an awakening module (not shown) and a sleeping module (not shown). The awakening module awakens a node in response to a change in an input to said node during runtime. That is, the awakening module is used to waken a node whenever a change is detected in the input to that node. In addition, the sleeping module puts a node to sleep when the operations in the node during runtime have completed.

Figure 4:
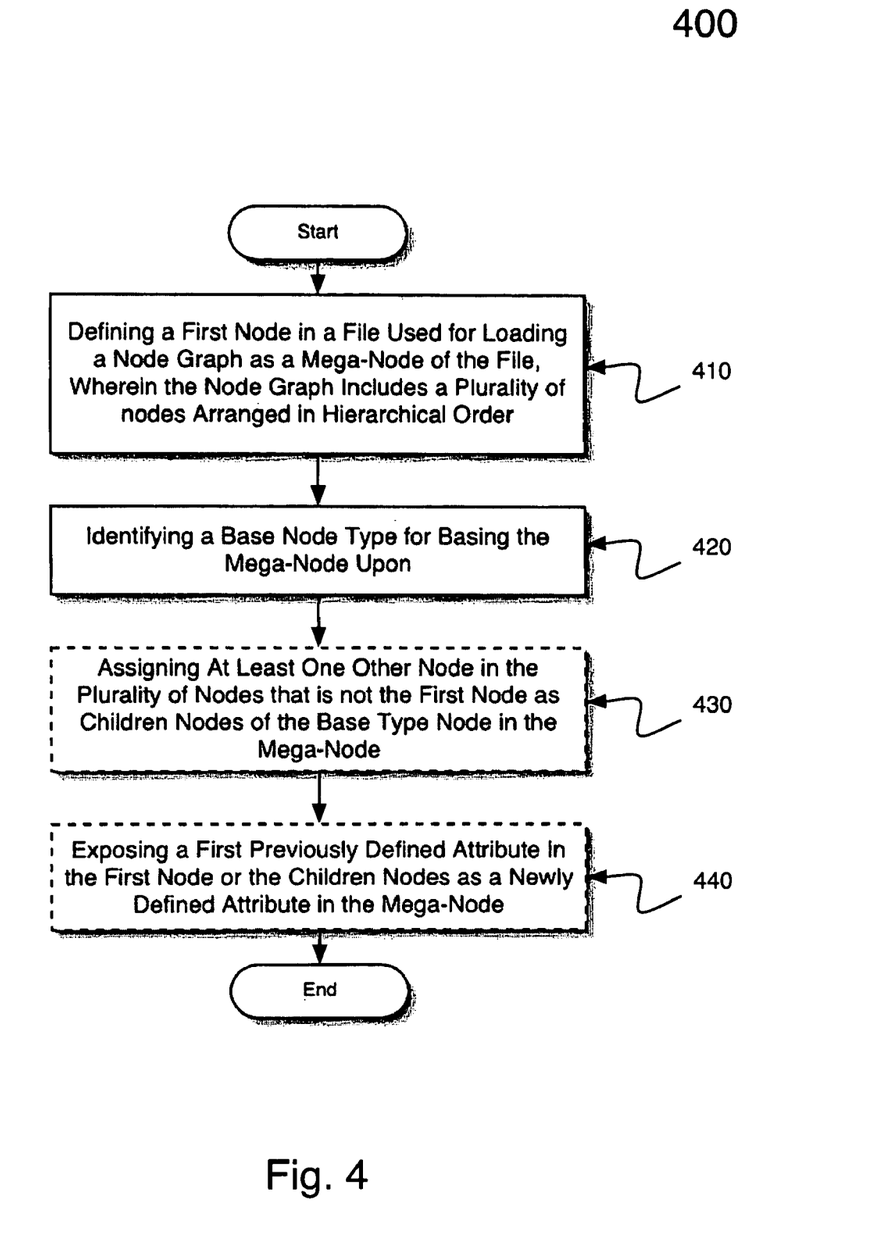
FIG. 4 is a flow chart illustrating steps in a computer implemented method for combining nodes in a subtree of an XML file that is used in an effects engine, in accordance with one embodiment of the present invention.

FIG. 4 is a flow chart 400 illustrating steps in a computer implemented method for combining nodes in a file, in accordance with one embodiment of the present invention. More particularly, the flow chart 400 combines nodes in a subtree of nodes in a file used in an effects engine.

At 410, the present embodiment defines a first node in the file as a mega-node of the file. The file is used to load a node graph. The node graph file comprises a plurality of nodes arranged in hierarchical order (e.g., parent/child relationships). As such, the hierarchical order provides a node graph representative of the nodes in the file.

For example, as described previously, the file is an XML file in one embodiment. For purposes of illustration only, the present embodiment is described within the context of combining nodes into a mega-node in an XML file, however, other embodiments are well suited to combing nodes into a mega-node for a file of any format that is used for loading a node graph.

More particularly, the mega-node is recognized as an object in an in-memory representation of the XML file. In addition, the mega-node is implemented within the execution of the XML file by restoring the mega-node as the third node in the XML file. This is accomplished by copying the base node type and any of its children nodes as the mega-node into a global registry of nodes for the XML file. The global registry maps tags in the XML file to objects that were previously defined (e.g., C++ objects). The mega-node is accessed under its newly defined name (e.g., "touchable-image" of Table 1).

At 420, the present embodiment identifies a base node type upon which the mega-node is based. The base node type is a string (e.g., word or group of words) chosen from all of the available strings that are predefined in the registry of the application defined by the XML file.

At 430, the present embodiment optionally assigns at least one other node in said plurality of nodes as children nodes to the base node type. The children nodes are not the base node type. That is, the mega-node may have no children assigned to it in one embodiment, or the mega-node may have one or more children assigned to it in another embodiment. For instance, in the case where the mega-node has children, the mega-node is based on a node in a subtree of nodes that has the highest hierarchy, in one embodiment. As such, the remaining nodes of the subtree are potentially children of that node.

In another embodiment, the mega-node is based on a neutral node (e.g., group node) that has no defined hierarchy within the XML file. As such, all nodes within the XML can be children nodes of the neutral node that is used as the base node type of the mega-node.

At 440, the present embodiment optionally exposes a first previously defined attribute as a newly defined attribute in the mega-node. That is, attributes at a mega-node level that can be manipulated to effect changes within the mega-node are exposed. More specially, the previously defined attribute is linked to the newly defined attribute. The previously defined attribute was previously defined in either the base node type or any of its children nodes. As an example, from the configuration of nodes illustrated in Table 1, the newly defined attribute, "touched," is linked to the active output of the check-rect node, which was previously defined.

In another embodiment, the mega-node is implemented within a template. The template is used to map values for the newly defined attribute for use in the XML file as implemented within an effects engine. For instance, the template is used to set a value for the newly defined attribute within a range of values as provided by the template. In another embodiment, the template provides a sliding bar to set the value of the newly defined attribute for use in the XML file.

In accordance with another embodiment of the present invention, new features can be added to the XML file through the use of the mega-node implementation. That is, attributes for the mega-node that are not linked directly to the previously defined attributes in the base node type or its children nodes are newly defined. The newly defined attributes are used to create new features as implemented by the corresponding node in the XML file.

In addition, the mega-node is implemented through a script node (e.g., the perl script), in one embodiment. That is, when the mega-node is called within the XML file, a script is called that provides additional functionality to the node.

In one embodiment, the base node type is a script node. As such, the mega-node is based on the script node. In addition, the script node is a parent to any of the children nodes as defined in the mega-node. In another embodiment, the script node is implemented within one of the children nodes of the mega-node. For instance, the base node type may be the group node that provides no functionality within the XML file, except to define the mega-node.

In one embodiment, the script node is able to define new attributes, read these attributes, and operate the mega-node using these new attributes. More particularly, the script is able to assign the base node, assign children nodes to the base node, and expose previously defined attributes at the mega-node level. In this way, the mega-node provides a window into the functionality provided by the nodes encapsulated within the mega-node. As a result, new features based on these new attributes can be added to the XML file.

For instance, the new feature can be implemented within the XML file by defining the newly defined attribute as an output to the mega-node. Thereafter, the newly defined attribute, as an output, can be used as an input to other nodes within the XML file. For instance, once the output to the mega-node is changed, notification of the change is presented to all nodes that subscribe to that change.

Table 2 below is an illustration of an exemplary pseudocode that implements a script node for defining a mega-node.

TABLE 2

Mega-Node Representation of a Subtree Using Scripts

```
<define name = "report"
              base = "script">
    flappiness:double
    pressure:double
    onChange='...
        print "f=", get ("flappiness") ... '
    <check-rect . . . />
</define>
<report flappiness.link =
        prev::*@pressure"/>
```

As shown in Table 2, the mega-node allows for the additional feature of presenting a report on the display. The script is called whenever a change is detected in the attribute "pressure." The "pressure" attribute indicates how much the display is being pressed. As such, when pressure is detected, a report is generated through the use of the mega-node.

Accordingly, embodiments of the present invention are able to define a mega-node that is able to combine multiple nodes as well as scripted behavior. As a result, the mega-node can support both scripted content, precompiled content, and combinations of scripted and precompiled content. As a result, because a mega-node is able to support both scripts, and precompiled image analysis nodes or precompiled image transformation nodes, use of the mega-node allows for rapid development of content for interactive video display systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Embodiments of the present invention, a method and system for combining a subtree of nodes into a mega-node for a file that is used in an effects engine, examples of which are illustrated in the accompanying drawings, is thus described. While the present invention has been described in particular embodiments, it should be appreciated that the present invention should not be construed as limited by such embodiments, but rather construed according to the below claims.

What is claimed is:

1. A method of combining node functionality in an interactive display system, comprising:

identifying a first and second node from a plurality of nodes, wherein the first and second nodes each include a functionality corresponding to the processing of input, output, or input and output data;

linking the output of the first node to the input of the second node to effectuate the passage and processing of data as it corresponds to the functionality of each node;

defining the linked nodes as a mega-node;

placing the mega-node in a graph of nodes;

linking the mega-node with at least one other node in the graph of nodes;

linking an output of the mega-node in the graph of nodes to the input of a second node in the graph of nodes to effectuate the passage and processing of data as it corresponds to the collective functionality of the mega-node;
receiving camera based input at an interactive display;
processing the One or more characteristics of the camera based input via a collection of nodes including the mega-node, wherein the processing functionality of the first and second node is instantiated via parsing of the single mega-node; and
outputting data for rendering at the interactive display, the data having been processed in accordance with the functionality of the first and second nodes comprising the mega-node.

2. The method of claim 1, wherein the mega-node includes an input, output, or input and output.

3. The method of claim 1, wherein processing the one or more characteristics of the camera based input by the single mega-node occurs after processing of a portion of the camera based input data by another component of the interactive display system.

4. The method of claim 1, further comprising linking the mega-node in the collection of nodes.

5. The method of claim 1, further comprising linking the mega-node to a node from the collection of nodes.

6. The method of claim 1, wherein the nodes are defined in XML.

7. The method of claim 1, wherein the functionality of the first node is defined using a scripting language.

8. The method of claim 1, wherein the processing of the first node is defined with precompiled software code.

9. The method of claim 1, wherein the mega-node includes an input linked to the input of a constituent node.

10. The method of claim 1, wherein the mega-node includes an output linked to the output of a constituent node.

11. A computer-readable storage medium having embodied thereon a program, the program being executable by a processor to perform a method for combining node functionality in an interactive display system, the method comprising:
identifying a first and second node from a plurality of nodes, wherein the first and second nodes each include a functionality corresponding to the processing of input, output, or input and output data;
linking the output of the first node to the input of the second node to effectuate the passage and processing of data as it corresponds to the functionality of each node;
defining the linked nodes as a mega-node;
placing the mega-node in a graph of nodes;
linking the mega-node with at least one other node in the graph of node;
linking an output of the mega-node in the graph of nodes to the input of a second node in the graph of nodes to effectuate the passage and processing of data as it corresponds to the collective functionality of the mega-node;
receiving camera based input at an interactive display;
processing the one or more characteristics of the camera based input via a collection of nodes including the mega-node, wherein the processing functionality of the first and second node is instantiated via parsing of the single mega-node; and
outputting data for rendering at the interactive display, the data having been processed in accordance with the functionality of the first and second nodes comprising the mega-node.

12. The computer-readable storage medium of claim 11, wherein the mega-node includes an input, output, or input and output.

13. The computer-readable storage medium of claim 11, wherein processing the one or more characteristics of the camera based input by the single mega-node occurs after processing of a portion of the camera based input data by another component of the interactive display system.

14. The computer-readable storage medium of claim 11, the method further comprising linking the mega-node in the collection of nodes.

15. The computer-readable storage medium of claim 11, the method further comprising linking the mega-node to a node from the collection of nodes.

16. The computer-readable storage medium of claim 11, wherein the nodes are defined in XML.

17. The computer-readable storage medium of claim 11, wherein the functionality of the first node is defined using a scripting language.

18. The computer-readable storage medium of claim 11, wherein the processing of the first node is defined with precompiled software code.

19. The computer-readable storage medium of claim 11, wherein the mega-node includes an input linked to the input of a constituent node.

20. The computer-readable storage medium of claim 11, wherein the mega-node includes an output linked to the output of a constituent node.

21. A computer system, comprising:
a processor for processing information;
and a computer readable memory device coupled to the processor and containing program instructions that when executed by the processor cause the processor to implement a method of combining node functionality in an interactive display system, the method comprising:
identifying a first and second node from a plurality of nodes, wherein the first and second nodes each include a functionality corresponding to the processing of input, output, or input and output data;
linking the output of the first node to the input of the second node to effectuate the passage and processing of data as it corresponds to the functionality of each node;
defining the linked nodes as a mega-node;
placing the mega-node in a graph of nodes;
linking the mega-node with at least one other node in the graph of nodes;
linking an output of the mega-node in the graph of nodes to the input of a second node in the graph of nodes to effectuate the passage and processing of data as it corresponds to the collective functionality of the mega-node;
receiving camera based input at an interactive display;
processing the one or more characteristics of the camera based input via a collection of nodes including the mega-node, wherein the processing functionality of the first and second node is instantiated via parsing of the single mega-node; and
outputting data for rendering at the interactive display, the data having been processed in accordance with the functionality of the first and second nodes comprising the mega-node.

22. The computer system of claim 21, wherein the mega-node includes an input, output, or input and output.

23. The computer system of claim 21, wherein processing the one or more characteristics of the camera based input by the single mega-node occurs after processing of a portion of the camera based input data by another component of the interactive display system.

24. The computer system of claim 21, further comprising linking the mega-node in the collection of nodes.

25. The computer system of claim 21, further comprising linking the mega-node to a node from the collection of nodes.

26. The computer system of claim 21, wherein the nodes are defined in XML.

27. The computer system of claim 21, wherein the functionality of the first node is defined using a scripting language.

28. The computer system of claim 21, wherein the processing of the first node is defined with precompiled software code.

29. The computer system of claim 21, wherein the mega-node includes an input linked to the input of a constituent node.

30. The computer system of claim 21, wherein the mega-node includes an output inked to the output of a constituent node.

* * * * *